(12) United States Patent
Wang et al.

(10) Patent No.: US 8,012,000 B2
(45) Date of Patent: Sep. 6, 2011

(54) EXTENDED PAD LIFE FOR ECMP AND BARRIER REMOVAL

(75) Inventors: Yuchun Wang, Santa Clara, CA (US);
Robert A. Ewald, Aptos, CA (US);
Wei-Yung Hsu, Santa Clara, CA (US);
Liang-Yuh Chen, Foster City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 850 days.

(21) Appl. No.: 11/695,484

(22) Filed: Apr. 2, 2007

(65) Prior Publication Data
US 2008/0242202 A1 Oct. 2, 2008

(51) Int. Cl.
*B24D 11/02* (2006.01)
(52) U.S. Cl. ............ 451/533; 51/297; 51/309; 451/550
(58) Field of Classification Search ............... 51/297, 51/307, 309; 451/36, 41, 526, 527, 529, 451/532, 533, 550
See application file for complete search history.

(56) References Cited

U.S. PATENT DOCUMENTS

| | | |
|---|---|---|
| 4,199,902 A | 4/1980 | Sauerland |
| 4,956,056 A | 9/1990 | Zubatova et al. |
| 5,217,586 A | 6/1993 | Datta et al. |
| 5,575,706 A | 11/1996 | Tsai et al. |
| 5,738,574 A | 4/1998 | Tolles et al. |
| 5,804,507 A | 9/1998 | Perlov et al. |
| 5,807,165 A | 9/1998 | Uzoh et al. |
| 5,823,854 A | 10/1998 | Chen et al. |
| 5,846,882 A | 12/1998 | Birang |
| 5,871,392 A | 2/1999 | Meikle et al. |
| 5,882,491 A | 3/1999 | Wardle et al. |
| 5,893,796 A | 4/1999 | Birang et al. |
| 5,911,619 A | 6/1999 | Uzoh et al. |
| 5,985,093 A | 11/1999 | Chen et al. |
| 6,004,880 A | 12/1999 | Liu et al. |
| 6,024,630 A | 2/2000 | Shendon et al. |
| 6,066,030 A | 5/2000 | Uzoh |
| 6,089,966 A | 7/2000 | Arai et al. |

(Continued)

FOREIGN PATENT DOCUMENTS
EP 0325753 8/1989
(Continued)

OTHER PUBLICATIONS

Alexander, Jr., "Electrically Conductive Polymer Nanocomposite Materials", http://www.afrlhorizons.com/Briefs/Sept02/ML0206.html, Date Unknown.

(Continued)

*Primary Examiner* — Timothy V Eley
(74) *Attorney, Agent, or Firm* — Patterson & Sheridan, L.L.P.

(57) ABSTRACT

A method and apparatus for extending a polishing article lifetime on a polishing tool with multiple platens is described. The apparatus includes an advanceable roll to roll platen with multiple embodiments of a polishing article to be used thereon. The polishing article is adapted to perform a polishing process by removing conductive and dielectric material from a substrate while minimizing downtime of the polishing tool. In some embodiments, the polishing article may be a dielectric material or a conductive material and is configured to include a longer usable lifetime to minimize replacement and downtime of the tool.

20 Claims, 4 Drawing Sheets

U.S. PATENT DOCUMENTS

| | | | |
|---|---|---|---|
| 6,090,239 A | 7/2000 | Liu et al. | |
| 6,156,124 A | 12/2000 | Tobin | |
| 6,159,079 A | 12/2000 | Zuniga et al. | |
| 6,176,992 B1 | 1/2001 | Talieh | |
| 6,183,354 B1 | 2/2001 | Zuniga et al. | |
| 6,244,935 B1 | 6/2001 | Birang et al. | |
| 6,248,222 B1 | 6/2001 | Wang | |
| 6,258,223 B1 | 7/2001 | Cheung et al. | |
| 6,297,159 B1 | 10/2001 | Paton | |
| 6,328,872 B1 | 12/2001 | Talieh et al. | |
| 6,368,190 B1 | 4/2002 | Easter et al. | |
| 6,379,223 B1 | 4/2002 | Sun et al. | |
| 6,409,904 B1 | 6/2002 | Uzoh et al. | |
| 6,431,968 B1 | 8/2002 | Chen et al. | |
| 6,497,800 B1 | 12/2002 | Talieh et al. | |
| 6,520,841 B2 | 2/2003 | Birang et al. | |
| 6,537,144 B1 | 3/2003 | Wijekoon et al. | |
| 6,561,873 B2 | 5/2003 | Tsai et al. | |
| 6,620,032 B2 | 9/2003 | Chopra | |
| 6,739,951 B2 | 5/2004 | Sun et al. | |
| 6,802,955 B2 | 10/2004 | Emesh et al. | |
| 6,848,977 B1 | 2/2005 | Cook et al. | |
| 6,863,797 B2 | 3/2005 | Sun et al. | |
| 6,884,153 B2 | 4/2005 | Manens et al. | |
| 6,899,602 B2 | 5/2005 | Fawcett et al. | |
| 6,899,804 B2 | 5/2005 | Duboust et al. | |
| 6,962,524 B2 | 11/2005 | Butterfield et al. | |
| 6,979,248 B2 | 12/2005 | Hu et al. | |
| 6,988,942 B2 | 1/2006 | Chen et al. | |
| 6,991,528 B2 | 1/2006 | Hu et al. | |
| 7,014,538 B2 | 3/2006 | Tietz et al. | |
| 7,029,365 B2 | 4/2006 | Chang et al. | |
| 7,059,948 B2 | 6/2006 | Li et al. | |
| 7,066,800 B2 | 6/2006 | Chen et al. | |
| 7,077,721 B2 | 7/2006 | Hu et al. | |
| 7,125,477 B2 | 10/2006 | Butterfield et al. | |
| 7,137,868 B2 | 11/2006 | Chang et al. | |
| 7,137,879 B2 | 11/2006 | Chen et al. | |
| 7,179,159 B2 | 2/2007 | Bonner et al. | |
| 7,207,878 B2 | 4/2007 | Hu et al. | |
| 7,297,239 B2 * | 11/2007 | Emesh et al. | 204/224 M |
| 2001/0005667 A1 | 6/2001 | Tolles et al. | |
| 2001/0024878 A1 | 9/2001 | Nakamura | |
| 2001/0035354 A1 | 11/2001 | Ashjaee et al. | |
| 2002/0011417 A1 | 1/2002 | Talieh et al. | |
| 2002/0108861 A1 | 8/2002 | Emesh et al. | |
| 2002/0130049 A1 | 9/2002 | Chen et al. | |
| 2002/0148732 A1 | 10/2002 | Emesh et al. | |
| 2003/0114087 A1 | 6/2003 | Duboust et al. | |
| 2003/0213703 A1 * | 11/2003 | Wang et al. | 205/662 |
| 2004/0020788 A1 | 2/2004 | Mavliev et al. | |
| 2004/0020789 A1 | 2/2004 | Hu et al. | |
| 2004/0134792 A1 | 7/2004 | Butterfield et al. | |
| 2004/0266322 A1 | 12/2004 | Shirakashi et al. | |
| 2005/0000801 A1 | 1/2005 | Wang et al. | |
| 2005/0016681 A1 * | 1/2005 | Emesh et al. | 156/345.12 |
| 2005/0092621 A1 | 5/2005 | Hu et al. | |
| 2005/0161341 A1 | 7/2005 | Duboust et al. | |
| 2005/0178666 A1 | 8/2005 | Tsai et al. | |
| 2005/0194681 A1 | 9/2005 | Hu et al. | |
| 2006/0030156 A1 | 2/2006 | Butterfield et al. | |
| 2006/0032749 A1 | 2/2006 | Liu et al. | |
| 2006/0070872 A1 | 4/2006 | Mavliev et al. | |
| 2006/0073768 A1 | 4/2006 | Mavliev et al. | |
| 2006/0172671 A1 * | 8/2006 | Chen et al. | 451/548 |
| 2006/0229007 A1 | 10/2006 | Mavliev et al. | |
| 2006/0231414 A1 | 10/2006 | Butterfield et al. | |
| 2007/0034506 A1 | 2/2007 | Hu et al. | |
| 2007/0062815 A1 | 3/2007 | Jia et al. | |
| 2007/0066201 A1 | 3/2007 | Chen et al. | |
| 2007/0111638 A1 | 5/2007 | Chang et al. | |
| 2007/0135024 A1 * | 6/2007 | Kobata et al. | 451/56 |
| 2007/0158207 A1 * | 7/2007 | Diao et al. | 205/641 |
| 2007/0254485 A1 * | 11/2007 | Mao et al. | 438/692 |
| 2007/0298692 A1 * | 12/2007 | Mavliev et al. | 451/56 |
| 2008/0020682 A1 * | 1/2008 | Jia et al. | 451/56 |
| 2008/0156657 A1 * | 7/2008 | Butterfield et al. | 205/662 |
| 2008/0277787 A1 * | 11/2008 | Liu et al. | 257/741 |
| 2008/0293343 A1 * | 11/2008 | Wang et al. | 451/508 |
| 2009/0061741 A1 * | 3/2009 | Wang et al. | 451/56 |

FOREIGN PATENT DOCUMENTS

| | | |
|---|---|---|
| EP | 0455455 | 11/1991 |
| EP | 1361023 | 11/2003 |
| JP | 11-042554 | 2/1999 |
| JP | 34-53352 | 10/2003 |
| WO | 00/03426 | 1/2000 |
| WO | 01/13416 | 2/2001 |
| WO | 01/49452 | 7/2001 |
| WO | 01/71066 | 9/2001 |
| WO | 02/064314 | 8/2002 |
| WO | 03/099519 | 12/2003 |
| WO | 2004/073926 | 9/2004 |

OTHER PUBLICATIONS

Contolini, "Electrochemical Planarization of ULSI Copper," Solid State Technology, vol. 40, No. 6, Jun. 1, 1997.

Nogami, "An Innovation in Integrate Porous Low-K Materials and Copper," InterConnect Japan 2001; Honeywell Seminar Dec. 6, 2001, p. 1-12.

* cited by examiner

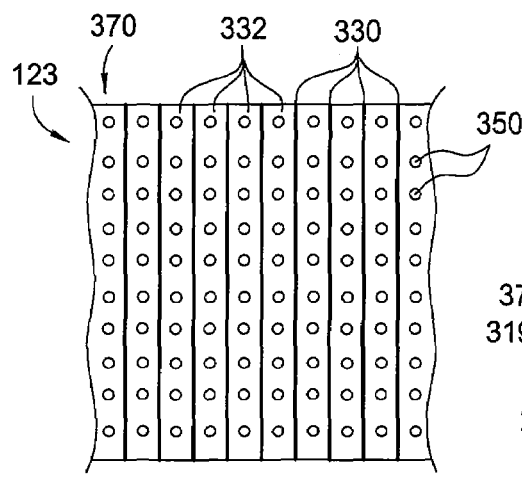
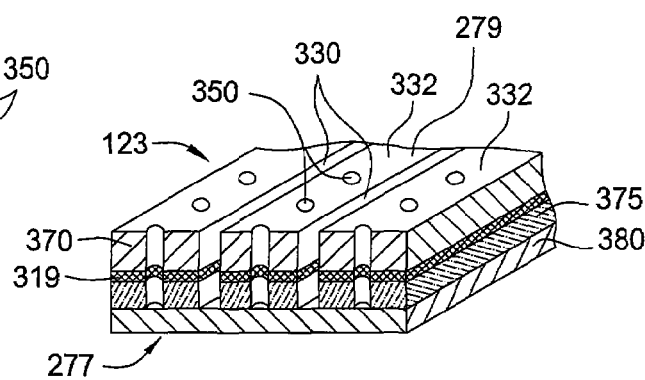
FIG. 3A
FIG. 3B
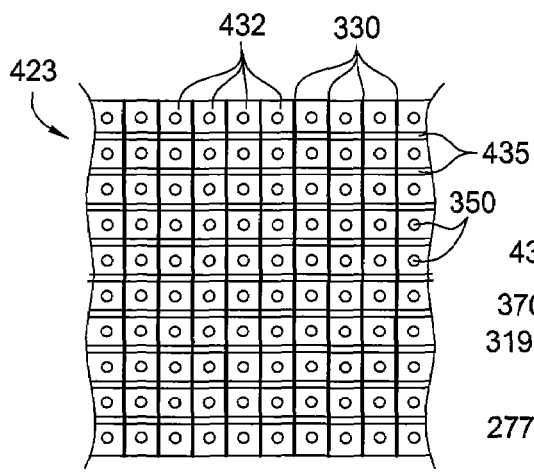
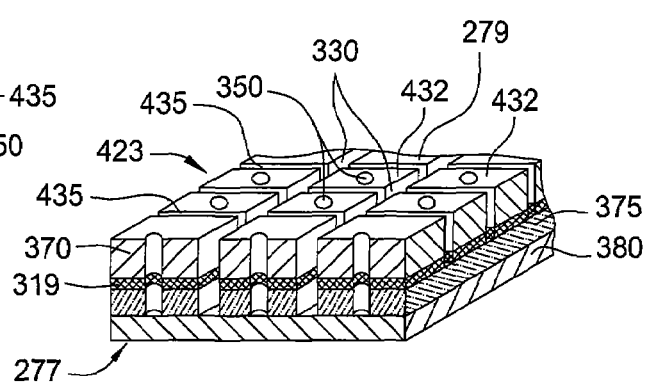
FIG. 4A
FIG. 4B
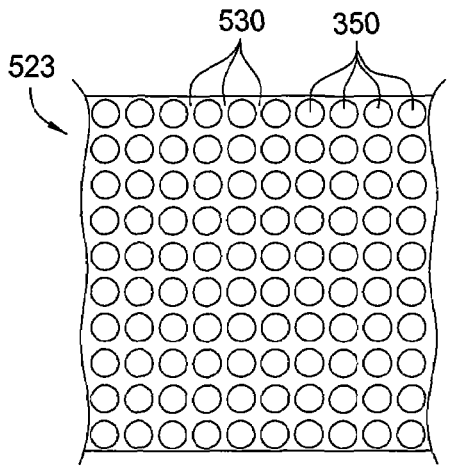
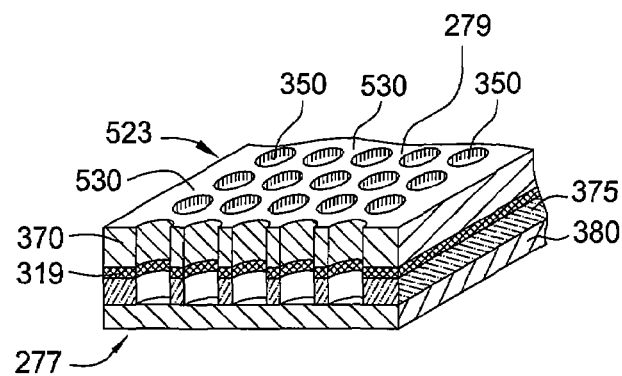
FIG. 5A
FIG. 5B

EXTENDED PAD LIFE FOR ECMP AND BARRIER REMOVAL

BACKGROUND OF THE INVENTION

1. Field of the Invention

Embodiments of the invention generally relate to an apparatus and method for polishing a substrate, such as a semiconductor wafer, more particularly, to a polishing article and apparatus for polishing a substrate utilizing an electrochemical mechanical process.

2. Description of the Related Art

In the fabrication of integrated circuits and other electronic devices on substrates, multiple layers of conductive, semiconductive, and dielectric materials are deposited on or removed from a feature side of a substrate. The sequential deposition and removal of these materials on the substrate may cause the feature side to become non-planar and require a planarization process, generally referred to as polishing, where previously deposited material is removed from the feature side of a substrate to form a generally even, planar or level surface. The process is useful in removing undesired surface topography and surface defects, such as rough surfaces, agglomerated materials, crystal lattice damage and scratches. The polishing process is also useful in forming features on a substrate by removing excess deposited material used to fill the features and to provide an even or level surface for subsequent deposition and processing.

The material removed by the planarization or polishing process may be facilitated by chemical means, mechanical means, electrical means, or a combination of chemical, electrical, and mechanical means effected, at least in part, by controllably urging the feature side of the substrate toward a polishing surface of a polishing pad. Generally, the polishing process is performed on a tool having one or more polishing stations, each station having a polishing pad or polishing article disposed thereon. Generally, each polishing station includes a polishing article on which the substrate is processed that is configured with different properties, such as hardness or compressibility, abrasiveness, smoothness, conductivity, grooving, embossment, and other physical differences selected to perform different stages of a planarization or polishing sequence at each polishing station.

One challenge facing a user of a multi-station tool is fitting each station with polishing articles having a known or otherwise predictable service life. However, due to the diverse properties of the polishing articles selected for each stage of the planarization sequence, and variations from process to process performed on each polishing station, the service life between polishing articles on a single tool is often quite different. For example, on a tool having two, three, or more, polishing stations, the polishing article lifetime may be quite different. This may increase the downtime of the tool by requiring numerous service periods to replace individual polishing articles one station at a time. While each polishing article may have a known lifetime and replacement may be scheduled, challenges to a user of a multi-station tool to increase the service life of the polishing articles disposed on each polishing station.

Therefore, what is needed is an improved polishing article for a tool having more than one polishing station that extends the service life of the polishing article relative to the remaining polishing article(s) disposed on other polishing stations.

SUMMARY OF THE INVENTION

Embodiments of the present invention generally provides a method and apparatus for extending a polishing article lifetime on a polishing tool with multiple platens. The apparatus includes an advanceable roll to roll platen with multiple embodiments of a polishing article to be used thereon. The polishing article is adapted to perform a polishing process by removing conductive and dielectric material from a substrate while minimizing downtime of the polishing tool. In some embodiments, the polishing article may be a dielectric material or a conductive material and is configured to include a longer usable lifetime to minimize replacement and downtime of the tool.

In one embodiment, a polishing article for a roll to roll polishing system is described. The polishing article includes a linear strip wound on a supply roll having a first conductive layer disposed on a second conductive layer with a dielectric layer therebetween, wherein the first conductive layer comprises a metal foam, a metal mesh, metal fibers, a metal/polymer composite, and combinations thereof.

In another embodiment, a polishing article for a roll to roll polishing system is described. The polishing article includes a plurality of conductive strips disposed on a conductive base layer with an insulating layer therebetween, wherein the conductive strips comprise a metal foam.

In another embodiment, a replacement supply roll for an electrochemical mechanical polishing process is described. The replacement supply roll includes a shaft having a polishing article wound thereon, and the polishing article includes a linear strip having a first conductive layer disposed on a second conductive layer with a dielectric layer therebetween.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A is a top view of one embodiment of a polishing article.

FIG. 3B is an isometric view of a portion of the polishing article of FIG. 3A.

FIG. 4A is a top view of another embodiment of a polishing article.

FIG. 4B is an isometric view of a portion of the polishing article of FIG. 4A.

FIG. 5A is a top view of another embodiment of a polishing article.

FIG. 5B is an isometric view of a portion of the polishing article of FIG. 5A.

To facilitate understanding, identical reference numerals have been used, where possible, to designate identical elements that are common to the figures. It is also contemplated that elements disclosed in one embodiment may be beneficially utilized on other embodiments without specific recitation.

DETAILED DESCRIPTION

Embodiments of the present invention describes an apparatus and method for extending polishing article service life, which is particularly beneficial for use with polishing tools having multiple polishing stations. The apparatus includes a polishing article that may be used on at least one station that is adapted to perform a portion of a planarization sequence by removing conductive and/or dielectric material from a substrate while minimizing downtime of the polishing tool.

Figure 1:
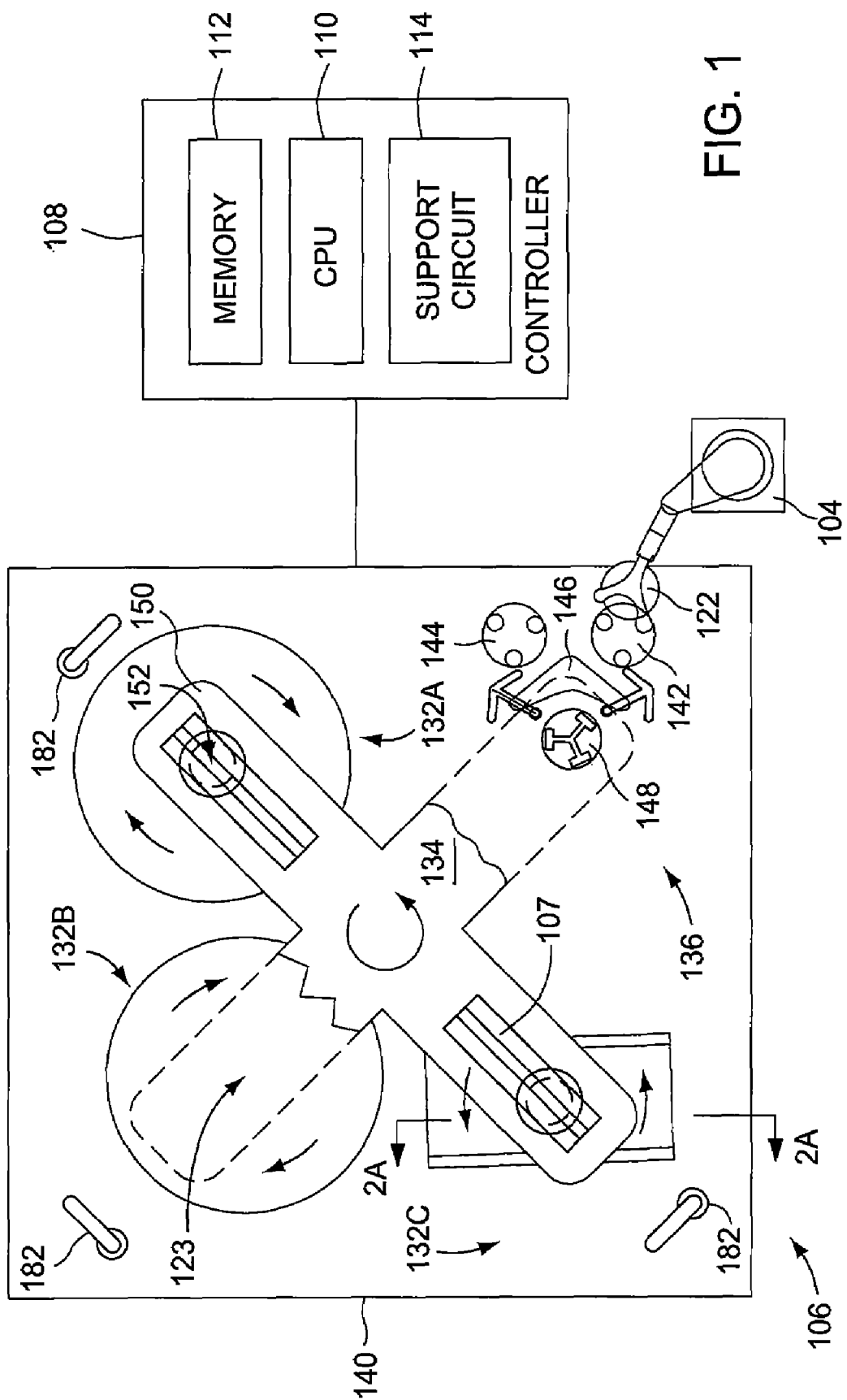
FIG. 1 depicts a plan view of one embodiment of a polishing tool having a plurality of polishing stations.

FIG. 1 depicts a plan view of one embodiment of a polishing tool 106, which may be a portion of a REFLEXION® Polishing tool, manufactured by Applied Materials, Inc., located in Santa Clara, Calif. Embodiments described herein may be used on this polishing tool, or on other polishing tools, including polishing tools from other manufacturers and particularly polishing tools that include one or more polishing stations configured for a polishing article in a roll format.

The tool 106 generally comprises a loading robot 104, a controller 108, a transfer station 136, a plurality of processing or polishing stations, a base 140, and a carousel 134 that supports a plurality of polishing or carrier head assemblies 152. In the embodiment depicted in FIG. 1, platen assemblies 132A-132C are shown. Generally, the loading robot 104 is disposed proximate the tool 106 and a factory interface 102 (not shown) to facilitate the transfer of substrates 122 therebetween.

The transfer station 136 generally includes a transfer robot 146, an input buffer 142, an output buffer 144 and a load cup assembly 148. The input buffer station 142 receives a substrate 122 from the loading robot 104. The transfer robot 146 moves the substrate 122 from the input buffer station 142 to the load cup assembly 148, where the substrate is then transferred to the carrier head assembly 152. An example of a transfer station that may be used to advantage is described in reference to the FIGS. 2-6 in U.S. Pat. No. 6,156,124, issued Dec. 5, 2000, entitled "Wafer Transfer Station for a Chemical Mechanical Polisher", which is incorporated herein by reference.

To facilitate control of the tool 106 as described above, the controller 108 comprises a central processing unit (CPU) 110, support circuits 114 and memory 112. The CPU 110 may be one of any form of computer processor that can be used in an industrial setting for controlling various polishers, drives, robots and sub-processors. The memory 112 is coupled to the CPU 110. The memory 112, or computer-readable medium, may be one or more of readily available memory such as random access memory (RAM), read only memory (ROM), floppy disk, hard disk, or any other form of digital storage, local or remote. The support circuits 114 are coupled to the CPU 110 for supporting the processor in a conventional manner. These circuits include cache, power supplies, clock circuits, input/output circuitry, subsystems, and the like.

Generally, the carousel 134 has a plurality of arms 150 that each support one of the carrier head assemblies 152. Two of the arms 150 depicted in FIG. 1 are shown in phantom such that the transfer station and a polishing article 123 disposed on platen assembly 132B may be seen. The carousel 134 is indexable such that the carrier head assemblies 152 may be moved between the platen assemblies 132 and the transfer station 136.

Typically, a polishing process is performed at each platen assembly 132A-132C by moving the substrate 122 retained in the carrier head assembly 152 relative to the polishing article 123 supported on each platen assembly. Each platen assembly may perform a polishing process on the substrate by a chemical mechanical polishing (CMP) process, an electrochemical mechanical polishing (ECMP) process, or a combination of a CMP process and an ECMP process.

In one example of operation, the carrier head assembly 152 holds the substrate in a facing relationship to a polishing surface of the polishing article 123, and controllably urges the feature side of the substrate towards the polishing surface of the polishing article 123. The platen assembly rotates the polishing article 123 relative to the substrate retained in the carrier head assembly 152, which may be rotated, and/or otherwise moved relative to, the rotating polishing article 123. The movement of one or both of the carrier head assembly 152 and the polishing article 123 effects at least mechanical removal of material deposited on the feature side of the substrate. Chemicals and/or slurry solutions may also be flowed to the polishing surface of the polishing article to enhance the removal of material from the substrate. The slurry solutions may include abrasive particles to enhance mechanical removal. Electrolytic solutions may be flowed to the polishing surface of the polishing article 123 to promote electrochemical removal of material from the substrate during ECMP processes.

In one example, one of platen assemblies 132A-132C includes a polishing article 123 configured for a CMP process. In this example, the polishing articles 123 disposed on each platen assembly may include a polishing surface comprised of polymeric materials, such as polyurethanes, thermosets, rubber, and the like, having a smooth surface, a textured surface, a surface containing abrasives or a combination thereof. In one aspect, the polishing articles may be circular or round, and in some applications, at least one of the platen assemblies 132A-132C may be configured as a roll to roll system, wherein the polishing article 123 advances from a supply roll to a take-up roll. For example, the polishing article 123 may be incrementally advanced across, and be intermittently fixed during processing to, the platen assembly. The polishing article may be fixed by adhesives, vacuum, mechanical clamps, tensioning, or by other holding methods to the platen assembly, and is released intermittently to advance the polishing article across the platen assembly after processing a predetermined number of substrates.

In another example, one or more of the platen assemblies 132A-132C may be configured for an ECMP process, wherein the polishing article 123 is at least partially conductive. In this example, the polishing article 123 may include a conductive polishing surface adapted to effect electrochemical and mechanical removal of material from the substrate. For example, the polishing article 123 may include a partially conductive polishing surface that may comprise a dielectric material that includes conductive elements disposed within, or extending from, the dielectric material. In another example, the polishing surface may comprise a conductive polymeric material having conductive elements or particles disposed therein, such as tin (Sn) particles, copper (Cu) particles, or other particles of a material having a hardness equal to or less than copper that are disposed in or on the polymeric material. In yet another example, the conductive polishing surface may comprise a metal foil, a mesh of fibers, a cloth, or a soft polymeric material that may be coated with a conductive material. The polishing surfaces of the polishing articles may include grooves, embossments, or otherwise textured, or the polishing surface may be smooth. Examples of conductive polishing articles 123 which may be adapted to benefit from embodiments described herein may be found in U.S. patent application Ser. No. 11/327,527, filed Jan. 5, 2006, which is incorporated by reference in its entirety.

As another example, each platen assembly 132A-132C may include a polishing article configured for a CMP process, or an ECMP process. In this example, two of the platen assemblies may include polishing articles configured for an ECMP process, while the remaining platen assembly may be configured for a CMP process. In another example, two of the platen assemblies may include polishing articles configured for a CMP process, while the remaining platen assembly may be configured for an ECMP process.

In all examples described above, the tool 106 may include the three platen assemblies 132A-132C and each platen assembly may be configured for the same process, or different processes. Further, in all examples described above, each platen assembly 132A-132C includes a polishing article with different properties, such as hardness or compressibility, abrasiveness, smoothness, conductivity, grooving, embossment, among other physical differences, selected to facilitate different removal rates or other process parameters at each platen assembly. The specific properties of the polishing articles are generally chosen for the desired process which is to be performed at a respective platen assembly, and the properties of the polishing article and/or the process performed at the platen assembly influences the lifetime of the polishing article.

Figure 2A:
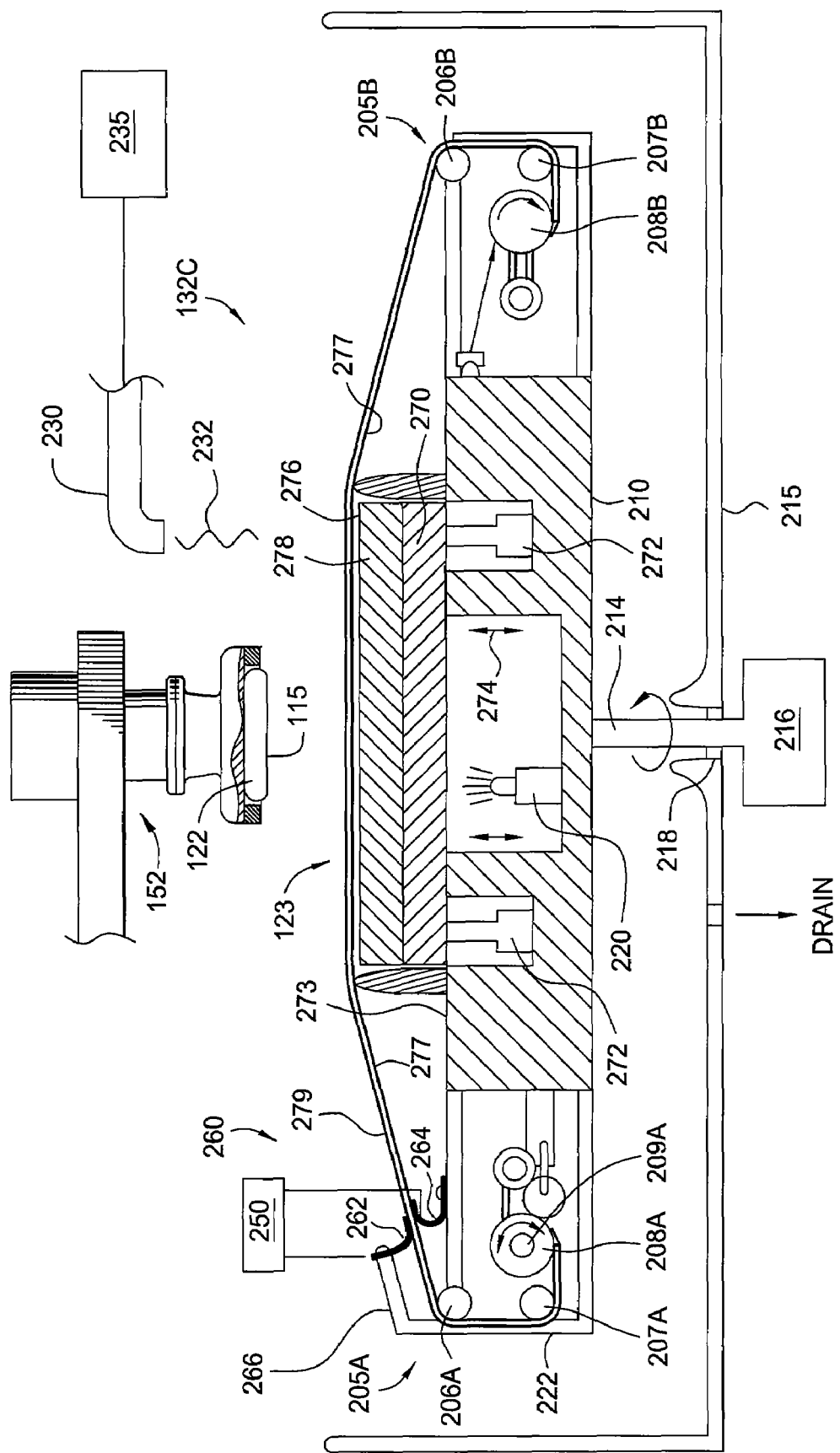
FIG. 2A is a side cross-sectional view of one embodiment of a platen assembly of one of the polishing stations of FIG. 1.

FIG. 2A is a side cross-sectional view of the platen assembly 132C depicted in FIG. 1. A carrier head assembly 152 having a substrate 122 disposed therein is shown above the platen assembly 132C. As explained above, a deposit receiving or feature side 115 of the substrate 122 is in a facing relationship with the polishing article 123, and the carrier head assembly 152 may be controllably urged towards the polishing article 123 to effect removal of material from the feature side 115 of the substrate 122. The platen assembly 132C includes a rotatable base 210 that is coupled to a motor 216 by a shaft 214. To facilitate rotation of the base 210, the shaft 214 is disposed through a basin 215 by a rotary coupling 218, which may be a bearing that also provides a fluid seal. A nozzle 230 is disposed above the platen assembly 132C for supplying a fluid 232 from a fluid source 235. The fluid 232 may be a CMP polishing solution, such as a slurry, or other chemical solutions, which may include abrasive particles. In one embodiment, the fluid 232 is an electrolyte to facilitate an ECMP process. The fluid 232 is flowed onto the surface of the rotating polishing article 123 while excess fluid flowing off of the polishing article 123 may be caught by the basin 215.

The platen assembly 132C also includes a supply assembly 205A and a take up assembly 205B. The supply assembly 205A includes a supply roll 208A, an upper guide member 206A and a lower guide member 207A. The supply roll 208A generally contains a rod or shaft 209A having an unused portion of polishing article 123 wound thereon, and is configured so that it may easily be replaced with another supply roll 208A containing a new polishing article 123 once the polishing article 123 disposed on the supply roll 208A has been consumed by the planarizing process. Generally, the lower guide member 207A is positioned to lead the polishing article 123 from the supply roll 208A to the upper guide member 206A. One example of a replaceable supply roll that may be adapted to benefit from embodiments described herein is disclosed in U.S. Pat. No. 6,244,935, issued Jun. 12, 2001, entitled "Apparatus and Methods for Chemical Mechanical Polishing with an Advanceable Polishing Sheet", incorporated herein by reference in its entirety. Another example of a replaceable supply roll that may be adapted to benefit from embodiments described herein is described in U.S. patent application Ser. No. 11/119,682, filed May 2, 2005, which published on Nov. 2, 2006 as United States Patent Publication No. 2006/0246831, which is incorporated by reference in its entirety.

The take-up assembly 205B includes a take-up roll 208B, an upper guide member 206B and a lower guide member 207B. The take-up roll 208B generally contains a used portion of polishing article 123 and is configured so that it may easily be replaced with an empty take-up roll once take-up roll 208B is filled with used polishing article 123. The upper guide member 206B is positioned to lead the polishing article 123 from the base 210 to the lower guide member 207B. The lower guide member 207B leads the polishing article 123 onto the take-up roll 208B. The platen assembly 132 may also comprise an optical sensing device 220, such as a laser, adapted to transmit and receive optical signals for detecting an endpoint to the planarizing or polishing process performed on a substrate.

The polishing article 123 is generally moved in relation to the base 210 by balancing the forces between a motor (not shown) coupled to the supply assembly 205A and a motor (not shown) coupled to the take-up assembly 205B. One or both of the motors may be configured to provide tension to the polishing article 123 by reversing or locking, or other tensioning devices (not shown) may be coupled to a portion of the supply assembly 205A and/or the take up assembly 205B. An example of an advanceable polishing assembly is disclosed in FIGS. 2-8 of U.S. Pat. No. 6,503,131, issued Jan. 7, 2003, entitled "Integrated Platen Assembly for a Chemical Mechanical Planarization System", which is incorporated herein by reference. Alternative and optional drive systems are contemplated by this invention, some of which can be found in the description of FIGS. 3A-7 of the previously incorporated U.S. Pat. No. 6,244,935.

Figure 2B:
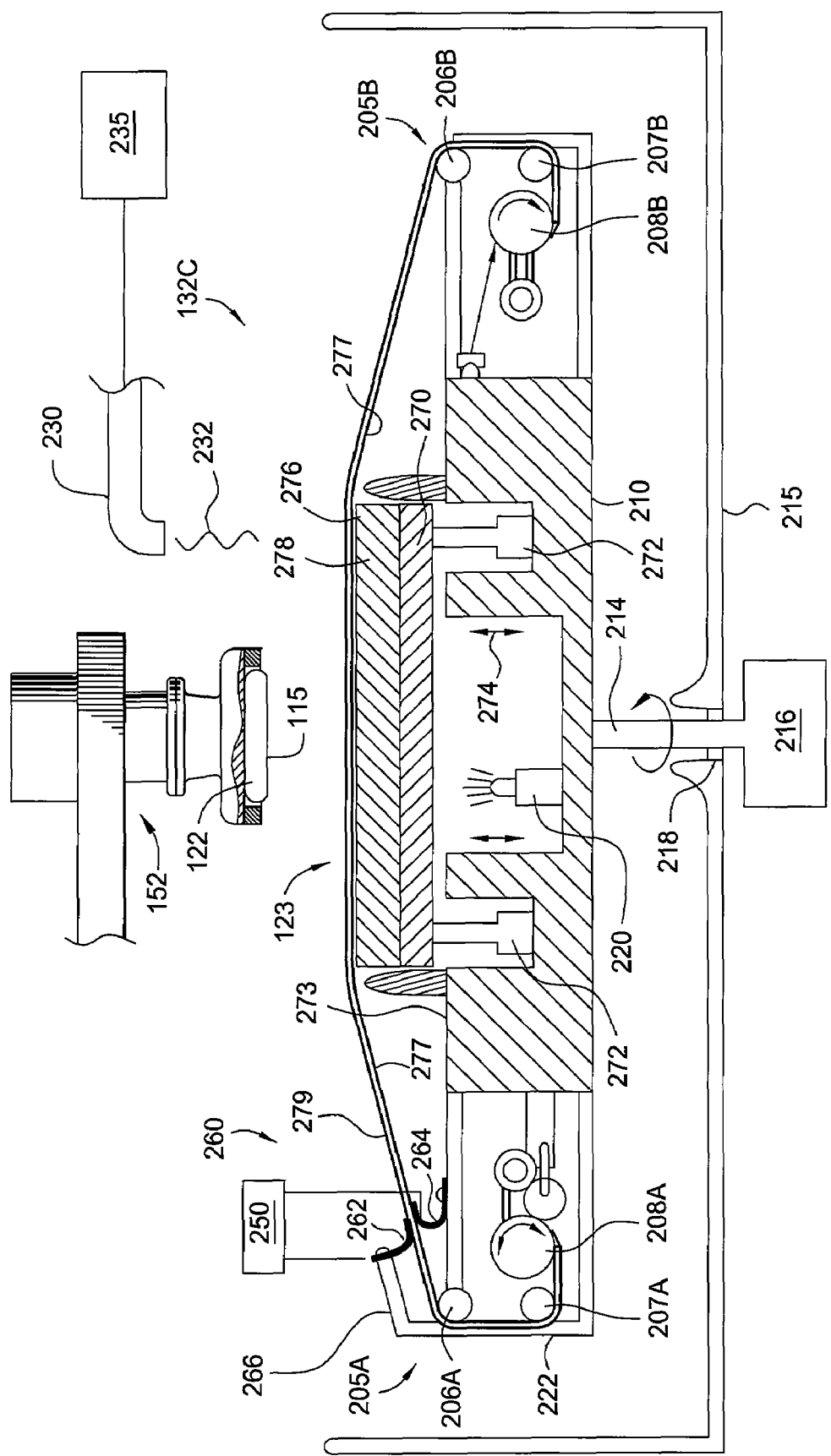
FIG. 2B is another side cross-sectional view of the platen assembly of FIG. 2A.

The platen assembly 132C also includes a translational or movable platen 270 coupled to the rotatable base 210. The movable platen 270 may comprise a polygonal shape and is movably coupled to the base 210 at least one lift mechanism 272 disposed in or on the base 210. The lift mechanisms 272 are generally adapted to raise and lower at least a portion of the movable platen 270 relative to the base 210 in the direction indicated by arrow 274. For example, when the lift mechanisms 272 are actuated in the upper direction of arrow 274, the movable platen 270 is spaced apart from an upper surface 273 of the base 210 which tensions the article 123, as shown in FIG. 2B. The lift mechanisms 272 may include linear actuators, such as a rotary lead screw, or other actuators that may be powered magnetically, electrically, hydraulically, pneumatically, or by other suitable conventions. Each of the lift mechanisms 272 may lift or lower the movable platen 270 independently or separately, and may include two, four, six, or any number of lift mechanisms on opposing sides of the movable platen 270. In one embodiment, the platen assembly 132C includes four lift mechanisms 272 coupled to or supporting the movable platen 270 at or near each corner of the movable platen 270.

The movable platen 270 also includes a compressible portion 278. The compressible portion 278 includes an upper surface 276 that is configured to selectively contact and at least partially support a lower surface 277 of the polishing article 123. The movable platen 270 may be fabricated from a rigid material, such as aluminum, stainless steel, polymers, ceramics, and the like. The compressible portion 278 may be made of a polymeric material, such as an open or closed cell polymeric foam, felts, and the like. In one example, polymeric materials marketed under various trade names such as SUBA™, and PORON® may be used. The polymeric materials may include a compressibility between about 15% and 19%, and a Shore A hardness between about 63 Shore A and 71 Shore A, such as about 67 Shore A. Other polymeric materials include urethanes having a density between about 18 pounds/foot$^3$ and about 27 pounds/foot$^3$, such as between about 20 pounds/foot$^3$ and about 25 pounds/foot$^3$, and a Shore A hardness between about 3 Shore A to about 12 Shore A. Other urethanes having a Shore A hardness less than about 3 Shore A to about 8 Shore A may also be used.

The lift mechanisms 272 may be adapted to lift or lower the movable platen 270 in unison. Alternatively, the lift mechanisms may be actuated separately or independently to lift or lower a portion of the movable platen 270. In this manner, the movable platen 270 may be lifted, for example, to a position that is parallel to the upper surface 273 of the base 210. Alternatively, one side of the movable platen 270 may be lifted (or lowered) to a position that is not parallel with the upper surface 273 of the base 210. In an example where the movable platen 270 includes a lift mechanism in communication with each corner; one, two, or three lift mechanisms may be actuated for example, to lift one, two, or three corners of the movable platen 270 to a non-parallel or tilted orientation relative to the upper surface 273 of the base 210. The independent movement of the lift mechanisms 270 may improve control of the polishing process by providing a greater pressure against the substrate at one side of, or more than one corner of, the movable platen 270.

FIG. 2B is another side cross-sectional view of the platen assembly 132C with the movable platen 270, in a raised position. Is this view, the lift mechanisms 270 are extended to raise the movable platen 270 away from the upper surface 273 of the base 210. The extended or raised position of the one or more of the lift mechanisms 270 may provide a processing position for the platen assembly 132C by tensioning or tightening the polishing article 123 and positioning the compressible portion 278 against the lower surface 277 of the polishing article 123. In this manner, at least the upper surface 279 of the polishing article 123 may be supported by the compressible portion 278 and a polishing process may be enabled by subsequent contact with the substrate 122 and rotation of the base 210 and/or the carrier head assembly 152.

In operation, the polishing article 123 may be advanced incrementally as the movable platen 270 is in a lowered position in order to relieve at least a portion of the tension of the polishing article 123. In the lowered position, the polishing article 123 may be advanced across the platen assembly 132C in increments between about 0.05 inches to about 1.5 inches, such as about 1.0 inches, to supply a fresh portion of the polishing article 123 to the platen assembly 132C. Likewise, raising the movable platen 270 by action of one or more of the lift mechanisms 260 may serve to add tension to the polishing article 123 to enable a polishing process.

In one embodiment, the polishing article 123 is a conductive polishing article to perform an ECMP process. To facilitate the ECMP process, an electrical biasing system 260 is coupled to the platen assembly 132C. In this embodiment, the lower surface 277 and an upper surface 279 of the polishing article 123 is conductive. An electrical signal or a voltage from a power source 250 may be applied to the upper surface 279 by an upper biasing device 262 and a different voltage from the power source 250 may be applied to the lower surface 277 by a lower biasing device 264. As the portion of the platen assembly 132C disposed in the basin 215 is adapted to rotate, the biasing device 262 may be coupled to the base 210 by an extension 266 from a sidewall 222 and the biasing device 264 may be coupled to the upper surface 273 of the base 210. The biasing device 262, 264 may be a spring, a brush, or a roller, that is compressed or biased against the respective surfaces 277, 279 of the polishing article 123. Electrical lines or wires from the power source 250 may be routed through the shaft 214.

In one embodiment, the upper biasing device 262 may be coupled to a pole of the power source 250 to provide an anodic bias to the upper surface 279 of the polishing article 123, and an opposing bias may be supplied to the lower biasing device 264 to provide a cathodic bias to the lower surface 277 of the polishing article 123 in order to facilitate an ECMP process. Alternatively, the polarity of the biasing device 262, 264 may be reversed in order facilitate an electrochemical plating process using the polishing article 123.

FIG. 3A is a top view of one embodiment of a polishing article 123. In this embodiment, the polishing article 123 comprises a linear strip having an upper surface 279 to define a polishing surface adapted to contact a feature side of substrate (not shown). The upper portion of the polishing article 123 comprises a polishing material 370 that may be made of a dielectric or a conductive material as described above. The polishing material 370 may be mounted on a base layer 380 with an intermediate layer 375 therebetween.

In one embodiment, the polishing material 370 is a polymeric material comprising a hard material made of a polyurethane having a Shore D hardness in a range between 30 Shore D to about 70 Shore D. Soft polymers may also be used having a Shore A hardness in a range between about 20 Shore A to about 80 Shore A. In this embodiment, the intermediate layer 375 may include a compressible, process resistant material that is more compliant than the polishing material 370 and may be bonded or adhered to the polishing material 370 by a suitable adhesive 319. Examples of the intermediate layer 375 include fabrics and polymeric materials, such as open or closed cell foams, and the like. The adhesive 319 may be a pressure and/or heat sensitive adhesive that is resistant to processing conditions. The base layer 380 may include a polymeric material, such as a polyethelene terephthalate (PET) film and the intermediate layer 375 may be bonded to the base layer 380 by an adhesive (not shown).

In another embodiment, the polishing article 123 is conductive. In this embodiment, the polishing material 370 may be at least partially conductive, and the base layer 380 may be conductive as well, the two conductive layers separated by the intermediate layer 375 that serves as an insulative layer. For example, the polishing material 370 is a first conductive layer and the base layer 380 is a second conductive layer, and the intermediate layer 375 is an insulating layer between the first and second conductive layers. In this embodiment, the first conductive layer or polishing material 370 may be made of conductive materials, such as conductive polymers or conductive fabrics or cloth made of, or coated with, a conductive material. The conductive materials may be carbon fibers or metallic materials, such as particles or coatings made of tin (Sn), gold (Au), copper (Cu), alloys thereof and derivatives thereof, and the like. In some embodiments, the polishing material 370 includes metallic materials in the form of metal foil, a metal foam, a mesh, fibers, a metallic/polymeric composite, a metal wool, and combinations thereof. The metallic materials may be metals, such as tin (Sn), copper (Cu), or a mixture of a tin and a copper material. The metal materials may also be impregnated or coated with a polyurethane material that increases the mechanical integrity of the polishing material 370 and enhances smoothness of the upper surface 279 of the polishing article 123.

The second conductive layer or base layer 380 may include a conductive material, such as a process resistant material that provides mechanical integrity and a degree of stiffness to the polishing article 123. Examples of conductive material for the base layer 380 include the same materials for the polishing material 370 and additionally stainless steel or a copper material in the form of a sheet, a mesh, a foam, or fibers, and combinations thereof. Although the base layer 380 may be a non-porous sheet, in some embodiments a metal mesh or a foil may also be used. The insulating or intermediate layer 375 may be made of a material similar to the embodiment described above, such as a polymeric foam that is softer and is more pliable than the polishing material 370. In this embodiment, the intermediate layer 375 is a dielectric material.

FIG. 3B is an isometric view of a portion of the polishing article shown in FIG. 3A. In some embodiments not dependent on the conductive or dielectric properties of the polishing article 123, the polishing article 123 may include a plurality of lateral grooves 330 formed in or through the polishing material 370. Each of the lateral grooves 330 may be formed through the polishing material 370 to the intermediate layer 375, or through the polishing material 370 and the intermediate layer 375 to the base layer 380 as shown. The area between the cross-machine direction grooves 330 may form strips 332 that, in this embodiment, are substantially perpendicular to the machine direction of article advance across the platen. The polishing article may also include a plurality of perforations formed in each strip 332 of the polishing article 123. Like the cross-machine direction grooves 330, the perforations may be formed through the polishing material 370 to the intermediate layer 375, or through the polishing material 370 and the intermediate layer 375 to the base layer 380 as shown. The cross-machine direction grooves 330 may enhance the polishing process by enabling transportation and retention of polishing liquids. In addition to transportation and retention of polishing fluids, the perforations 350 may enhance the electrochemical properties of the polishing article by allowing an electrolyte to be in communication with the base layer 380 in an ECMP process.

FIG. 4A is a top view of another embodiment of a polishing article 423 that may be used on the platen assembly 132C of FIGS. 2A and 2B and is similar to the polishing article 423 shown in FIGS. 3A and 3B. FIG. 4B is an isometric view of a portion of the polishing article 423 shown in FIG. 4A. In this embodiment, the polishing article 123 includes a plurality of polygonal portions 432 that may be any polygonal shape, such as a quadralateral as shown. The polygonal portions 432 are formed by a plurality of machine direction grooves 435 that extend across the length of the polishing article 423. The lateral grooves 435 may be formed through the polishing material 370 to the intermediate layer 375 as shown, or the grooves 435 may extend to the base layer 380. The machine direction grooves 435 may be used alone or in combination with the cross-machine direction grooves 330. The materials for the polishing material 370 and various layers 375, 380 may be similar to the materials discussed above.

FIG. 5A is a top view of another embodiment of a polishing article 523 that may be used on the platen assembly 132C of FIGS. 2A and 2B, and is similar to the polishing articles 123, 423 described above. FIG. 5B is an isometric view of a portion of the polishing article 523 shown in FIG. 5A. In this embodiment, the polishing article 523 is void of grooving and includes a plurality of perforations 350 formed in the polishing material 370 and the perforations are surrounded by remaining polishing material 530. The plurality of perforations 350 may extend through the polishing material 370 to the base layer 380, or may extend through the polishing material 370 to the intermediate layer 375. The perforations 350 in the polishing article 123 are substantially oval shapes, but may comprise other shapes, for example circular geometric shapes, such as a cone or hollow frustum i.e., a cone between substantially parallel planes. The materials for the polishing material 370 and various layers 375, 380 may be similar to the materials described above. In this embodiment, the upper surface of the remaining polishing material 530 may be textured, embossed, or otherwise roughened to enhance the polishing process.

In all embodiments described above, the polishing article 123 may be configured for a CMP process or an ECMP process. The grooves 330 and 435, while shown as rectangles and in linear orientations, may comprise any pattern or orientation to facilitate liquid retention and transportation. Although not shown, non-linear patterns of grooves, such as circular patterns, wavy or curved line patterns, and arc segment patterns may also be formed in or through the polishing material 370 and various layers. Other linear grooving patterns may also be formed in or through the polishing material 370 and various layers to define strips 332 or polygonal portions 432 that are trapezoidal or shaped as substantial parallelograms (both not shown).

In one embodiment, a replaceable supply roll having the polishing article 123 wound thereon is contemplated. In this embodiment, the supply roll, such as supply roll 208A, may be wound and filled with any embodiments of the polishing article 123 described herein, and delivered to a user in cleanroom packaging for use on a platen assembly.

While polishing article lifetimes tend to vary from process to process, and the lifetimes also vary between platen assemblies when the platen assemblies have different polishing articles disposed thereon, embodiments described herein mitigate the effects of polishing article life mismatch, at least between platen assemblies 132A and 132B relative to platen assembly 132C by providing a roll-form polishing article with extended service life. For example, the polishing articles disposed on platen assemblies 132A and 132B may each have a lifetime between about 800 to about 1000 substrates while a conventional polishing article disposed on platen assembly 132C may have a lifetime that is substantially shorter. The polishing article 123 as described herein is configured to replace the conventional polishing article disposed on platen 132C to facilitate a longer lifetime. In one application, the polishing articles disposed on platen assemblies 132A and 132B may have twice the lifetime of the polishing article 123 as described herein. In some applications, the polishing article 123 may have a similar lifetime as polishing articles disposed on platen assemblies 132A and 132B. Further, embodiments of the polishing article 123 may provide a more flexible downtime and replacement schedule since the polishing article 123 is configured in a roll to roll format, which reduces service interruptions and enhances substrate to substrate processing results. In this manner, throughput may be increased and cost of ownership may be minimized by using the polishing article 123 as described herein.

While the foregoing is directed to embodiments of the present invention, other and further embodiments of the invention may be devised without departing from the basic scope thereof, and the scope thereof is determined by the claims that follow.

The invention claimed is:

1. A polishing article for a roll to roll polishing system, comprising:
    a linear strip wound on a supply roll, the linear strip comprising a first conductive layer disposed on a second conductive layer with a dielectric layer therebetween, wherein the first conductive layer comprises a metal foam, a metal mesh, metal fibers, a metal/polymer composite, or combinations thereof.

2. The article of claim 1, wherein the first conductive layer and the dielectric layer include a plurality of perforations formed therein that are substantially aligned.

3. The article of claim 1, wherein the first conductive layer comprises a plurality of grooves formed therein.

4. The article of claim 3, wherein the dielectric layer comprises a plurality of grooves.

5. The article of claim 3, wherein the first conductive layer includes a plurality of perforations disposed between the plurality of grooves.

6. The article of claim 1, wherein the first conductive layer and the second conductive layer are bound to the dielectric layer by an adhesive.

7. The article of claim 1, wherein the first conductive layer comprises tin, copper, or a combination thereof.

8. The article of claim 1, wherein the second conductive layer comprises stainless steel or a copper material.

9. The article of claim 1, wherein the second conductive layer comprises a copper material in the form of a mesh.

10. A polishing article for a roll to roll polishing system, comprising:
   a plurality of conductive strips disposed on an insulating layer, the insulating layer disposed on a conductive base layer, wherein the conductive strips comprise a metal foam.

11. The article of claim 10, wherein the conductive strips are separated by a plurality of grooves.

12. The article of claim 10, wherein the polishing article includes a plurality of perforations formed through the conductive strips and the insulating layer.

13. The article of claim 10, wherein the metal foam comprises a tin material, a copper material, or combinations thereof.

14. The article of claim 10, wherein the conductive base layer comprises stainless steel.

15. A replacement supply roll for an electrochemical mechanical polishing process, comprising:
   a shaft having a polishing article wound thereon, the polishing article comprising:
      a linear strip having a first conductive layer disposed on a second conductive layer with a dielectric layer therebetween.

16. The supply roll of claim 15, wherein the first conductive layer and the dielectric layer include a plurality of perforations formed therein that are substantially aligned.

17. The supply roll of claim 15, wherein the first conductive layer comprises a plurality of strips separated by a plurality of grooves.

18. The supply roll of claim 15, wherein the first conductive layer and the second conductive layer are bound to the dielectric layer by an adhesive.

19. The supply roll of claim 15, wherein the first conductive layer comprises a foam made of a tin material, a copper material, or combinations thereof.

20. The supply roll of claim 15, wherein the second conductive layer comprises stainless steel or a copper material.

* * * * *